US 7,536,581 B2

(12) United States Patent
Fiske

(10) Patent No.: US 7,536,581 B2
(45) Date of Patent: *May 19, 2009

(54) AUTOMATIC MIGRATABLE SERVICES

(75) Inventor: Aaron Fiske, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/425,784

(22) Filed: Jun. 22, 2006

(65) Prior Publication Data

US 2007/0294577 A1 Dec. 20, 2007

Related U.S. Application Data

(60) Provisional application No. 60/747,364, filed on May 16, 2006.

(51) Int. Cl.
*G06F 11/00* (2006.01)
(52) U.S. Cl. .......................................................... 714/4
(58) Field of Classification Search .................. None
See application file for complete search history.

(56) References Cited

U.S. PATENT DOCUMENTS

| 5,951,694 | A | 9/1999 | Choquier |
| 6,539,494 | B1 | 3/2003 | Abramson |
| 6,859,834 | B1 | 2/2005 | Arora |
| 7,203,863 | B2 | 4/2007 | Pavlik |
| 7,392,421 | B1* | 6/2008 | Bloomstein et al. ............ 714/4 |
| 2003/0084062 | A1 | 5/2003 | Young |
| 2003/0163755 | A1* | 8/2003 | Fung et al. ..................... 714/4 |
| 2003/0177411 | A1 | 9/2003 | Dinker et al. |
| 2003/0233433 | A1* | 12/2003 | Halpern ...................... 709/222 |
| 2004/0153558 | A1 | 8/2004 | Gunduc et al. |
| 2005/0078681 | A1 | 4/2005 | Sanuki |
| 2007/0174661 | A1* | 7/2007 | Peddada ........................ 714/4 |

OTHER PUBLICATIONS

International Search Report for PCT/US07/60102, dated Feb. 15, 2008, 7 pages.

* cited by examiner

*Primary Examiner*—Michael C Maskulinski
(74) *Attorney, Agent, or Firm*—Fliesler Meyer LLP

(57) ABSTRACT

Singleton services can be automatically migrated from one application server to another in a cluster using a lease table and a migration master in case of a failure of the first application server.

23 Claims, 9 Drawing Sheets

ABSTRACT

AUTOMATIC MIGRATABLE SERVICES

CLAIM OF PRIORITY

This application claims priority to U.S. Provisional Application No. 60/747,364 entitled "Next Generation Clustering" filed May 16, 2006, and is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

In order to handle a large number of interactions, enterprise software applications can use application servers, such as J2EE application servers like the WebLogic Server™ available from BEA Systems, Inc., of San Jose, Calif. These application servers can be used in clusters that can interact with one another.

Some of the services of the application servers, called singleton services should be run on only one application server of a cluster. These singleton services can include JMS servers, transaction recovery services or any other software that should be only run in a single instance.

DETAILED DESCRIPTION

Database-less Leasing

Figure 1:
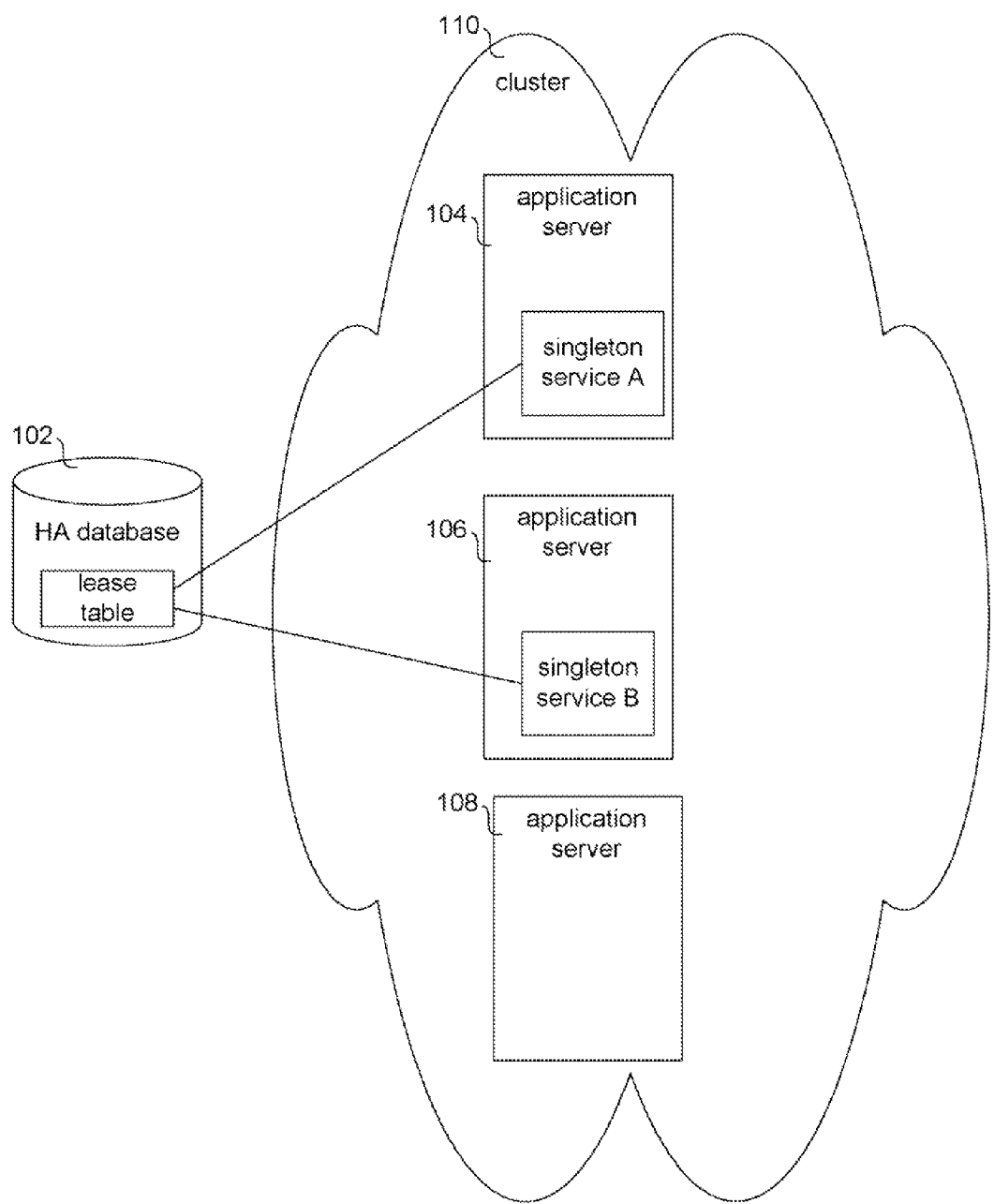
FIG. 1 shows a database-based leasing system.
Figure 2:
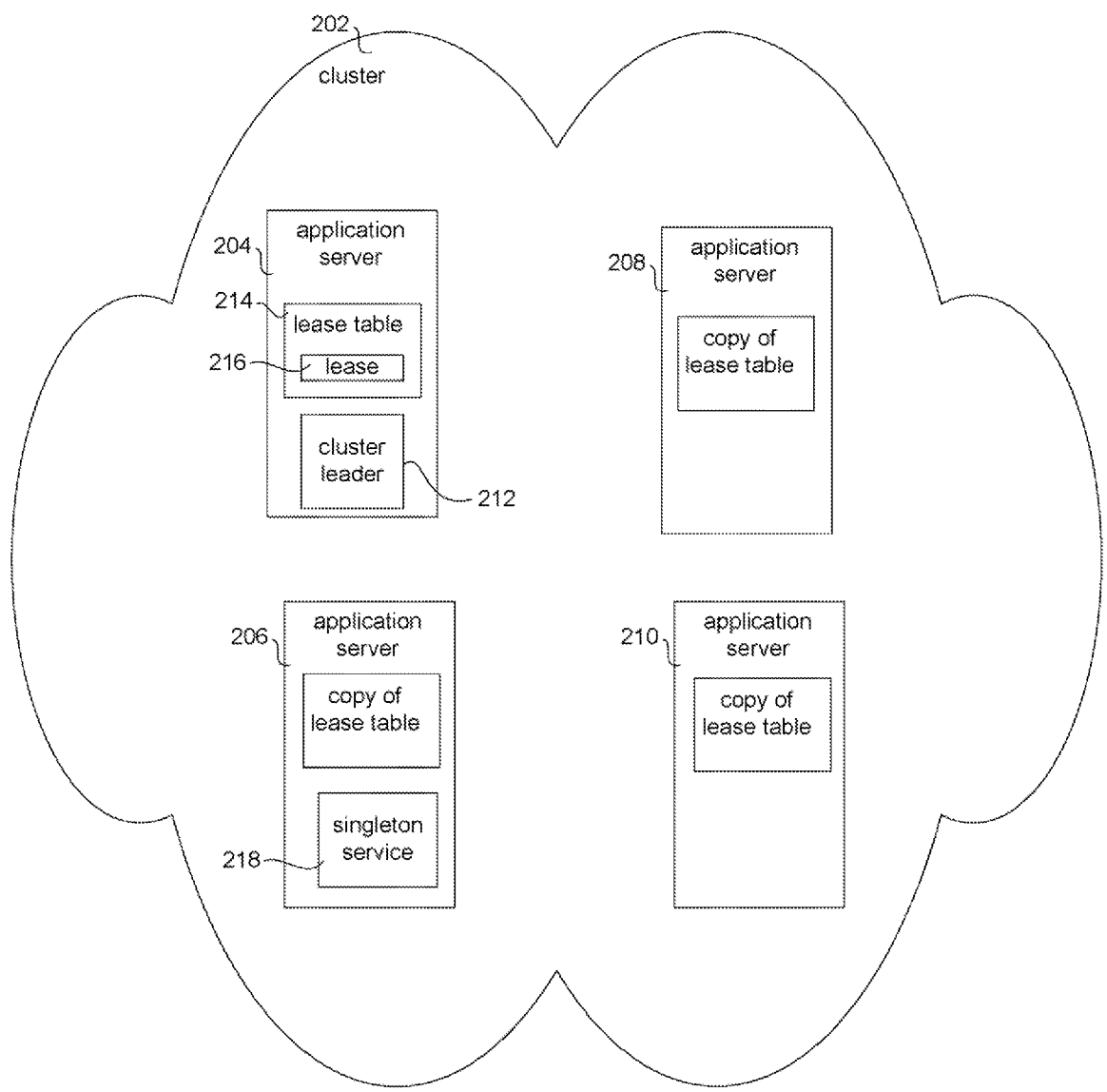
FIG. 2 shows a database-less leasing system of one embodiment of the present invention.

FIG. 1 shows an example of a leasing system using a database 102. In this example, application servers 104, 106 and 108 of the cluster 110 can rely on the database to provide access to a lease table 102. Leases at the lease table 102 can be used to indicate what application server should run a singleton service. The leases can be updated by the application server running the singleton service. In case of a crash, the lease will no longer be updated and will become invalid. This can allow one of the application servers of the cluster 110 to take over for a crashed or partitioned application server that was controlling the lease system.

In some cases, it is desired to avoid the requirement of a High Availability (HA) database for leasing. Embodiments of the present invention comprise a database-less leasing system.

One embodiment of the present invention is a computer-implemented method comprising a cluster 202 of application servers 204, 206, 208 and 210. The method can include determining a cluster leader 202, using the cluster leader 212 to set up a lease table 214 at one of the application servers, and using the lease table 214 to maintain least one lease 216 for a singleton service 218.

Since the lease table is stored at the application servers, no database is required. In one embodiment, copies of the lease table are maintained at each application server in the cluster so that the copy of the lease table is available in case of a crash or partition.

The lease tables can be used to allow automatic migration of the singleton service. Node managers can be used to determine the state of application servers in the cluster. The node manager can be a software program running on application server hosts. The node manager can be used to start and stop instances of the application servers.

The application server of the cluster that was started earliest can be selected to have the cluster leader. In one embodiment, the cluster leader is selected by a kind of competition. Every server in the cluster can periodically try to be the cluster leader. For example, every server in the cluster can try to be the cluster leader once every 30 seconds. If the cluster leader already exists, their attempt is rejected. If the cluster leader currently does not exist, the first server to try to claim it becomes cluster leader, thus preventing anyone else from becoming cluster leader. In this way, the application server of the cluster that was started earliest can be selected to have the cluster leader. Alternatively, the system can be designed such that a cluster leader could be selected by another method.

The cluster leader 212 can heartbeat other application servers of the cluster. The cluster leader 212 can store copies of the lease table in the other application servers of the cluster 202 to operate in case of a crash or partition of one or more application servers. In one embodiment, if the current cluster leader 212 fails to the heartbeat the other application servers, the other application servers can select another cluster leader.

One embodiment of the present invention comprises a cluster 202 of the application servers 204, 206, 208 and 210. A cluster leader is selected based on the first application server up. The cluster leader 212 is used to set up a lease table 214 at one of the application servers 204.

One embodiment of the present invention comprises a computer-implemented system wherein a lease table 214 is maintained at an application server 204 of a cluster 202 of application servers. Other application servers of the cluster can use the lease table 214 to maintain at least one lease 216 for a singleton service 218.

Figure 3A:
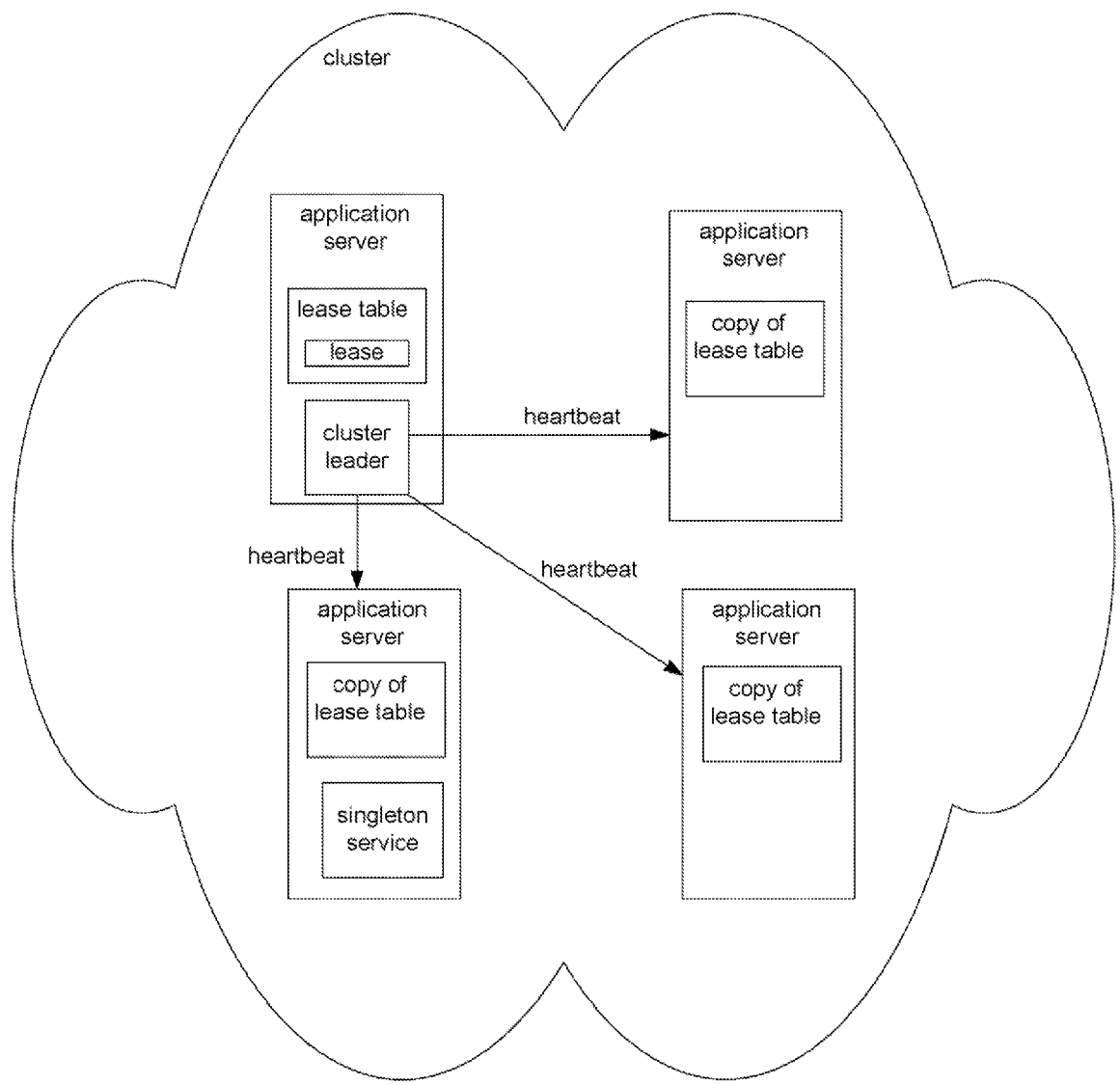
FIGS. 3A and 3B show a database-less leasing system of one embodiment of the present invention.
Figure 3B:
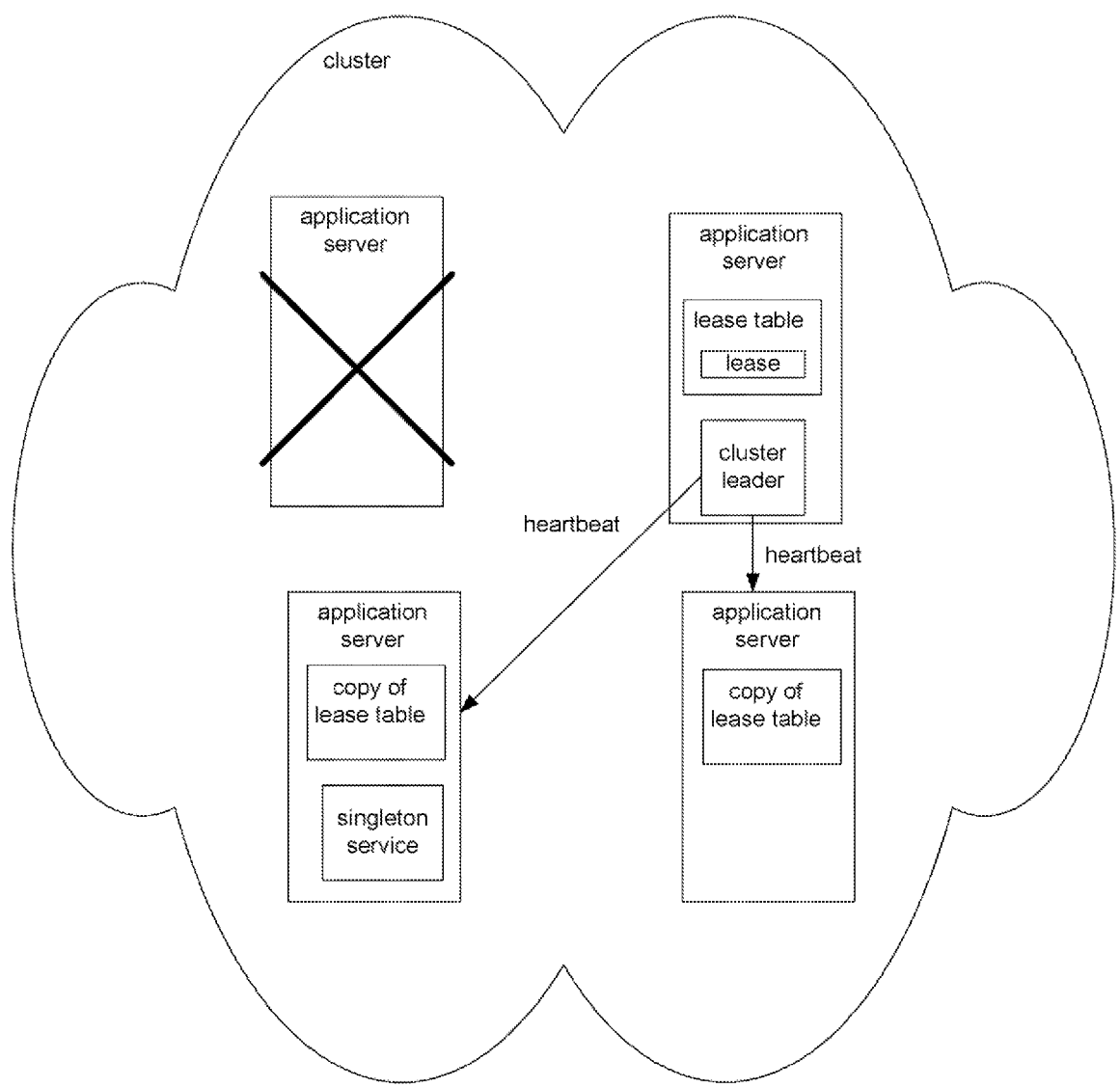

FIG. 3A shows a cluster leader heartbeating data to the other application server of the cluster. FIG. 3B shows another cluster leader being selected in the case of a crash of the application server having the current cluster leader. FIG. 3C shows another cluster leader being selected in the case of a partition of the network that makes the first application server unavailable.

Automatic Migratable Service

One embodiment of the present invention is a computer-implemented system comprising a first application server 402 of a cluster 404 that runs a singleton service 406. The first application server 102 maintaining a lease 408 for the singleton service 406 at a least table 410. A migration master 412 checks the lease table 410 and reassigns the singleton service 406 to a second application server 414 of a cluster 404 if the first application server 402 fails to maintain the lease 408. The lease table 410 can be maintained in a database or by using database-less leasing as described above.

Figure 4A:
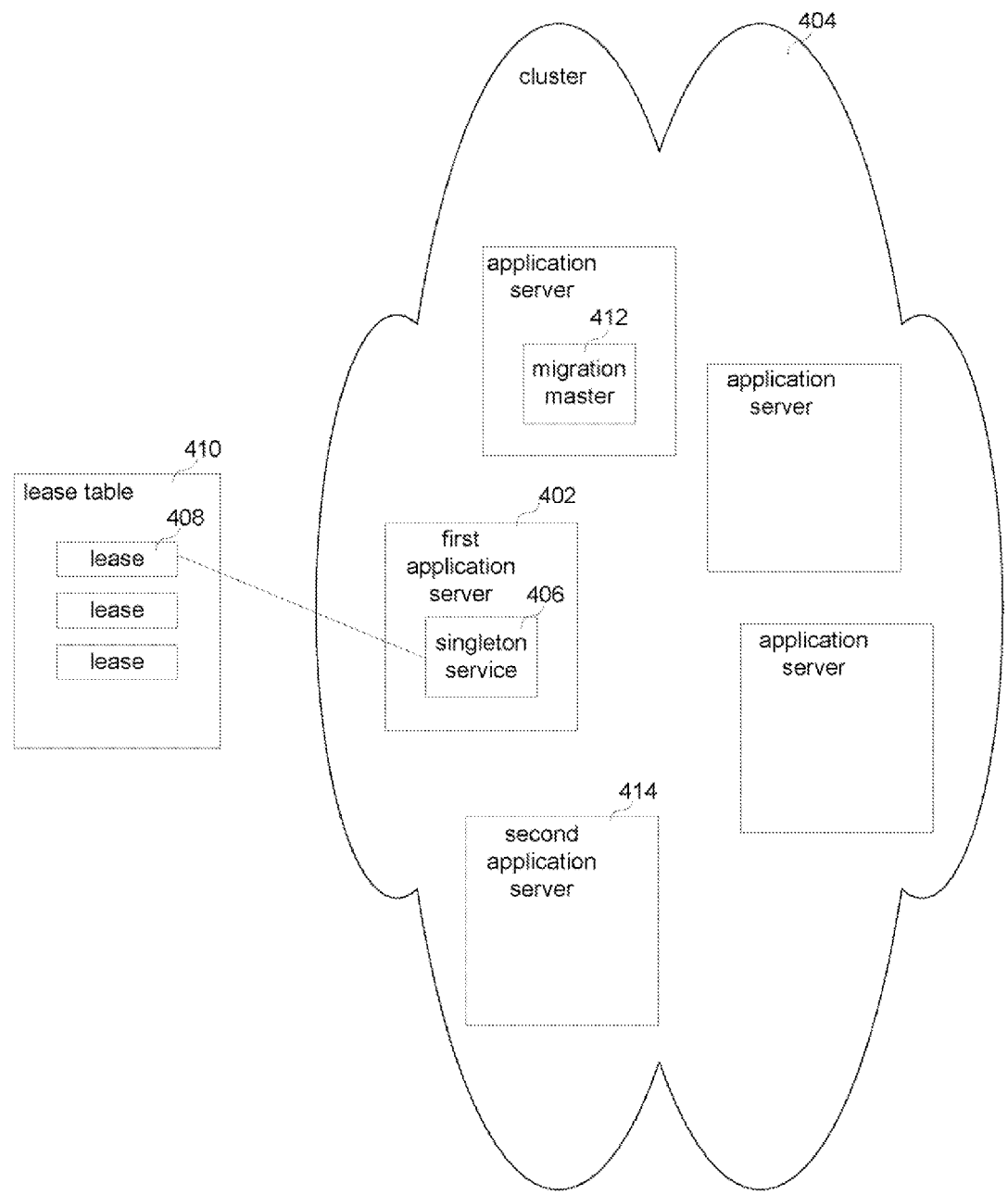
FIGS. 4A-4C illustrate an automatic migratable service system of one embodiment of the present invention.
Figure 4B:
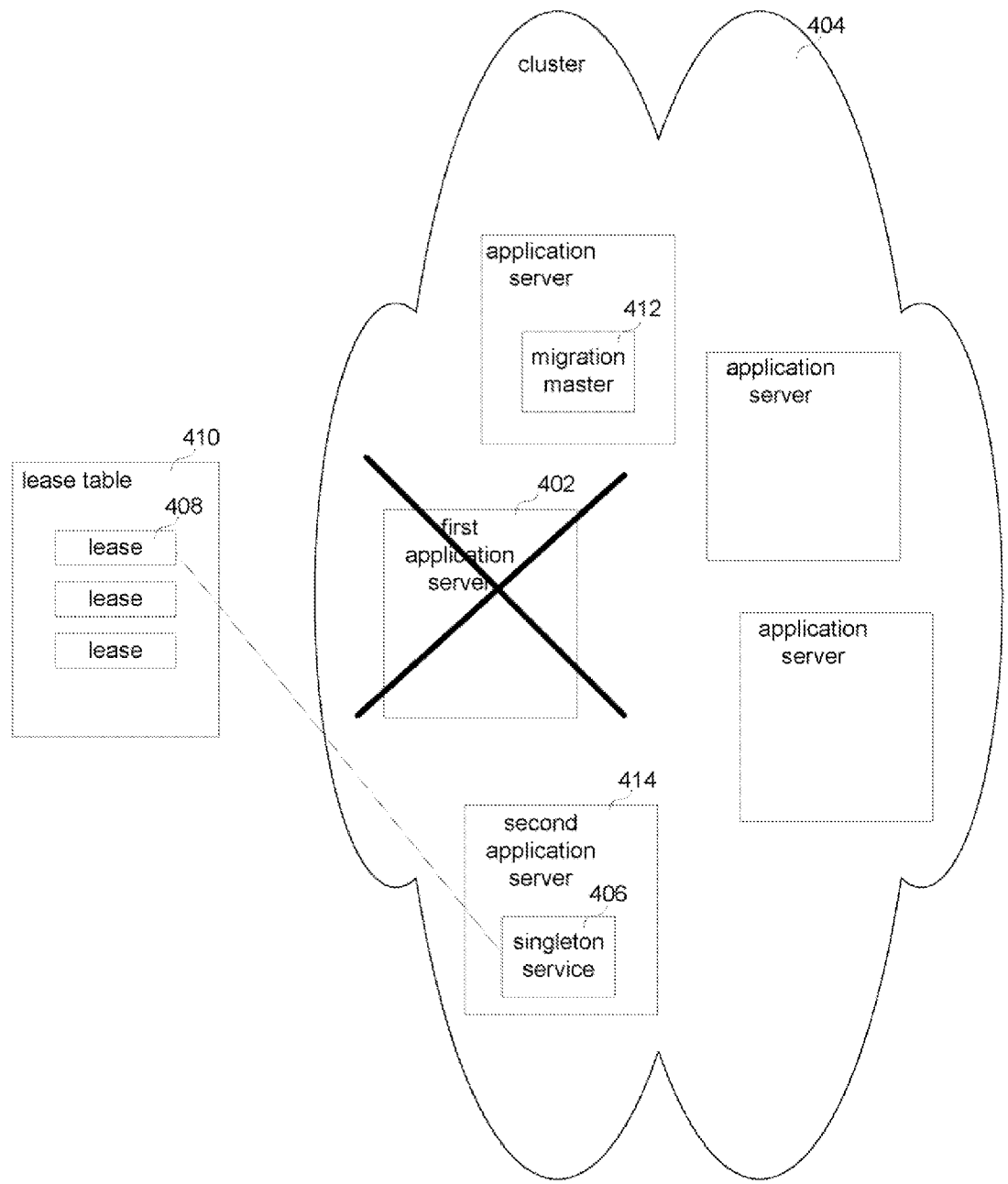
Figure 4C:
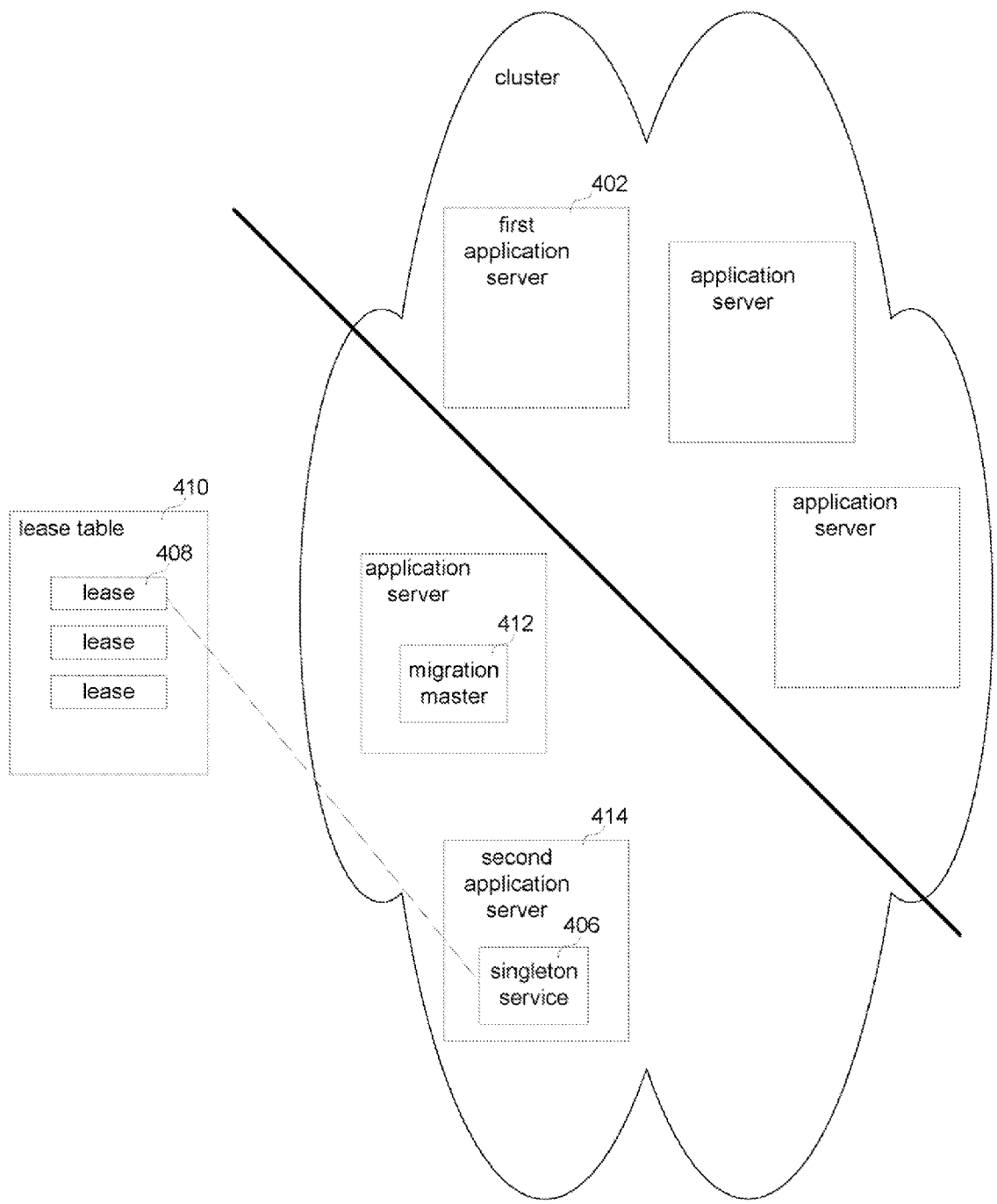
Figure 5A:
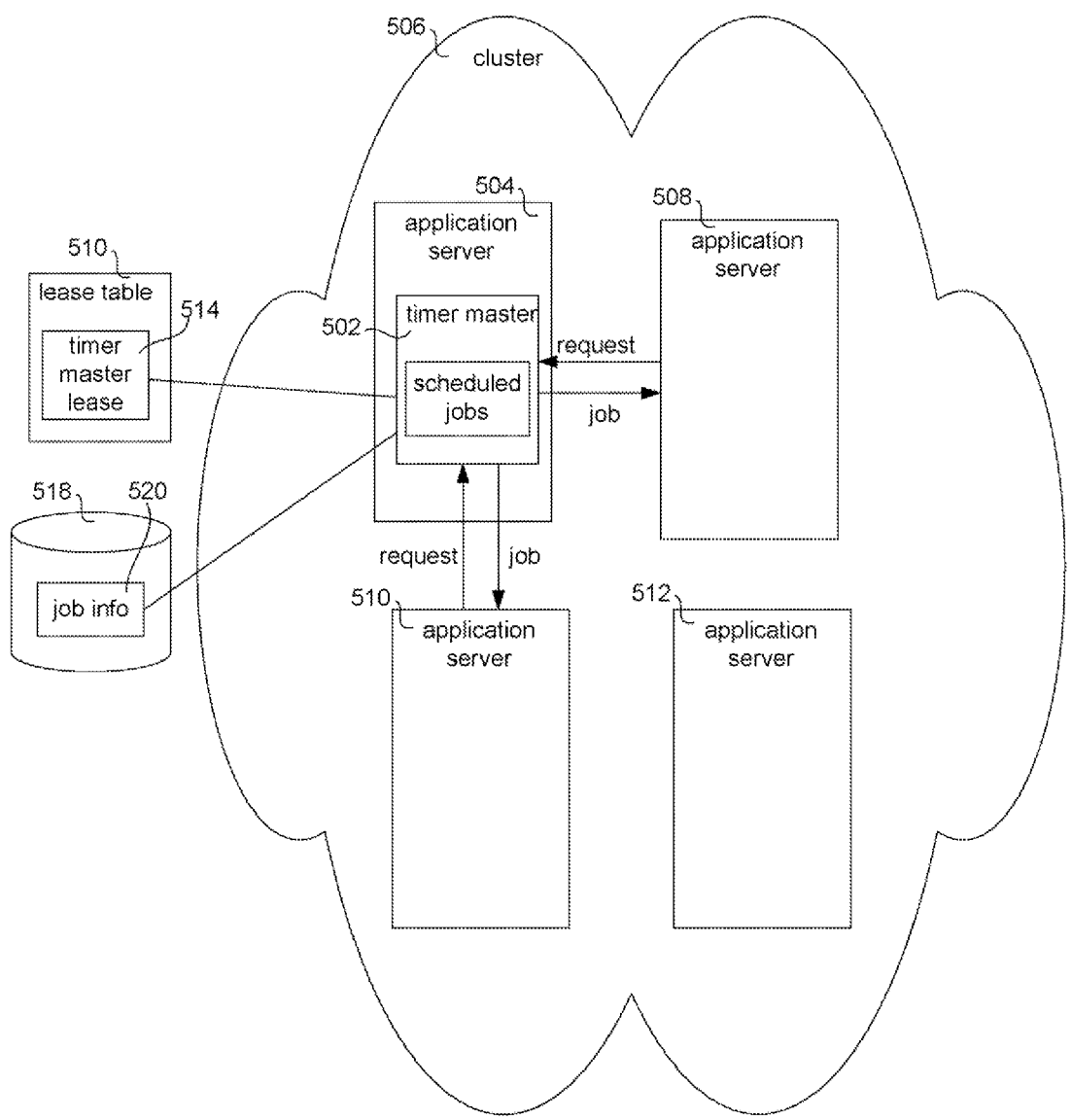
FIGS. 5A and 5B illustrate a job scheduler system.
Figure 5B:
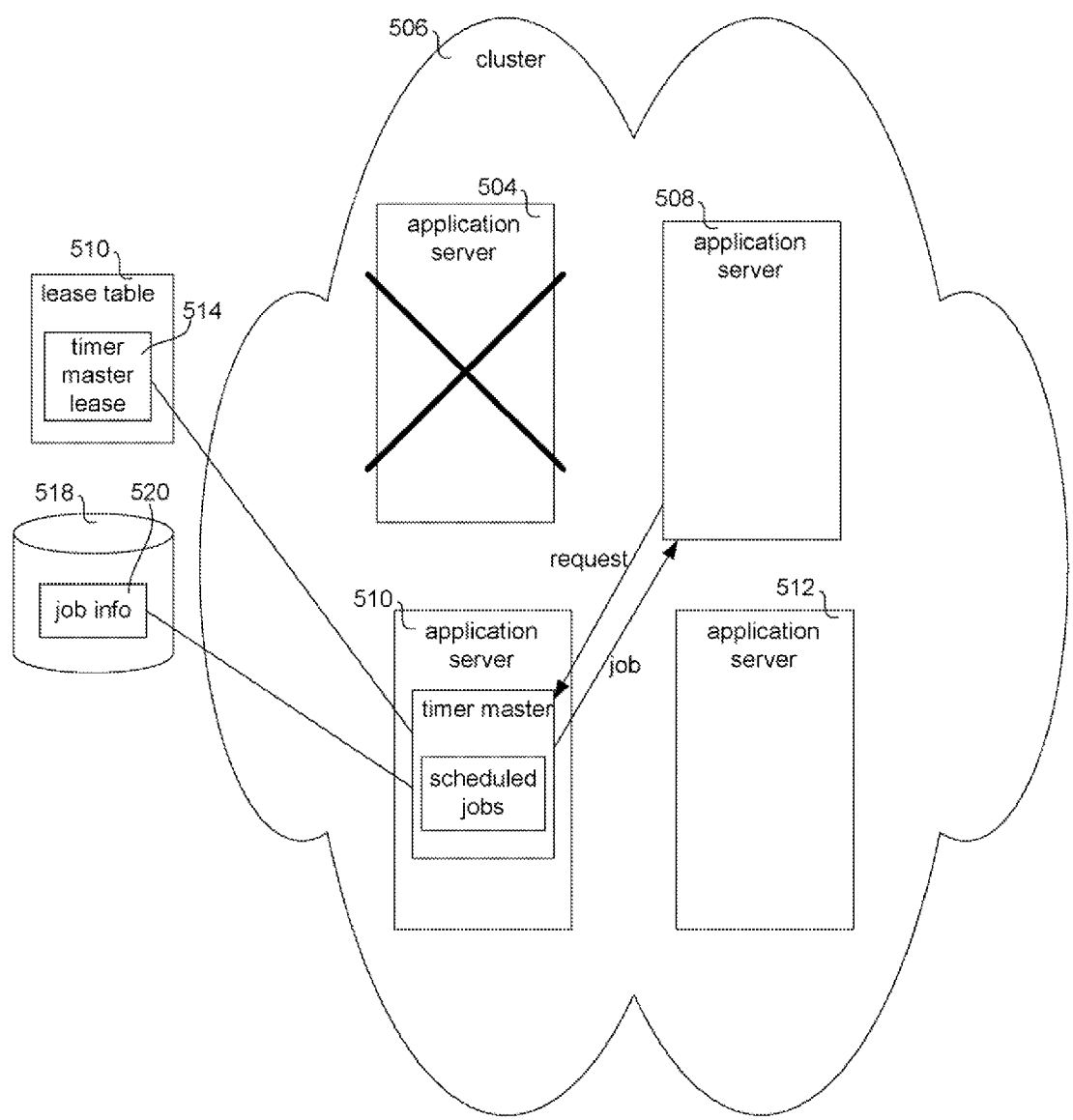

The first application server 402 can fail to update the lease because of a crash of the first application server as shown in FIG. 4B or the first application server 402 can fail to update the lease because the first application server 402 is partitioned from the lease table as shown in FIG. 4C. The first application server 402 can heartbeat the lease 408 to maintain control of the singleton service 406. The singleton service can be a JMS server, a timer master or any other software that should be run in a single instance.

The second application server 414 can run a predetermined activation script before getting the singleton service. The first application server 402 can run a predetermined deactivation script after giving up the singleton service. The migration master 412 can select the next application server to run the singleton service, such as be selecting the next application server.

In one embodiment, there can be a special rule if the singleton service is a Java Messaging System (JMS) service. If the singleton service is a JMS service, the migration manager can attempt a restart on the first application server before any migration.

One embodiment is a computer implemented method or computer readable media containing code to do the steps of updating a lease 408 at a lease table 410 for a singleton service. At first application server 402, checking the lease table 410 with a migration master 412. In addition, reassigning the singleton service 406 to a second application server if the first application server does not maintain the lease 408.

Job Scheduler

One embodiment of the present invention is a timer master 502 at an application server 504 of a cluster 506. The timer master 502 assigns scheduled jobs to other applications servers 508, 510 and 512 of the cluster. The application server 504 maintains a lease 514 for the timer master from a lease table 516. The timer master 502 storing job info 520 for the scheduled jobs in a database. In the case of a crash of the application server 504, another application server 510 of the cluster 506 can be assigned the time master 502 which can use the job info to assign scheduled jobs.

The scheduled jobs can include reports, such as database reports. Some reports can require a large number of database accesses and thus can take a lot of system resources. The scheduled jobs can thus be scheduled to run at an off-peak time so as to not reduce the performance of other applications. The lease table can be in the database or alternately a database-less leasing system can be used. The timer master 502 can be singleton service. The timer master 502 can be assigned to the application server 510 by a migration master. Other application servers can request jobs from the timer master 502.

One embodiment of the present invention is a computer-implemented system comprising a timer master 502 at an application server 504 of a cluster. The timer master 502 can assign scheduled jobs to other application servers, 508, 510 and 512 of the cluster 506. In the case of a crash of the application server 504, another application server 510 of the cluster 506 can be assigned the timer master that can assign scheduled jobs.

One embodiment of the present invention is an application server 504 of a cluster 506 assigning scheduled jobs to other application servers of the cluster 504. In the case of a crash of the application server 504, assigning another application server 510 the timer master 502. Thereafter, scheduled jobs being assigned using the timer master 502 at the other application server 510.

DETAILED DESCRIPTION OF EXEMPLARY EMBODIMENT

Details of one exemplary embodiment are described below. These details give one example of how to implement the claimed invention and are not meant to limit the scope of the invention or to narrow the scope of any of the claimed terms.

Advanced clustering features like automatic server and service migration, cluster wide singleton and lock manager can use leasing and lease management. Leasing can guarantee that only one member in a cluster gets ownership of the lease for a certain period of time that can be renewed. The lease owner is then able to execute certain privileged operations like migrating failed servers knowing that it has exclusive ownership of the lease. This specification describes how leasing and cluster master type of functionality can be implemented without any dependency on an external arbitrator like a high availability database.

LeaseManagers can be used by subsystems to obtain leases, register interest in getting a lease when one becomes available, find out the current owner of the lease etc. One type of leasing basis used for automatic server migration requires the presence of a High Availability (HA) database. In other words, the lease table is always hosted in the database and the database should be highly available for the cluster to query and update the leases.

The lease table can be hosted in one of the servers in the cluster and not in the database. This means that the cluster members can elect a server that will host the lease table and become the cluster Leader. This elected cluster Leader can be responsible for giving out leases, updating the lease table and replicating the updates automatically to the cluster. Replication is important for failover purposes. If the cluster Leader becomes unavailable and does not send heartbeat to the group asserting its presence, the members can start another round of voting to elect a new cluster master. The newly elected master can take ownership of the lease table. Apart from taking ownership and hosting the lease table, the cluster master owner can also perform automatic server migration of failed cluster nodes.

In one embodiment, consensus based leasing can meet the following requirements:
1. There will be at most one cluster master at any given point in time. This means that there will never be more than one cluster master but there could be short periods where the cluster is without a cluster master.
2. There will be short period just after the cluster startup when there is no cluster mast. The period could be in the order of minutes.
3. When the current cluster master dies, the election of a new cluster master can take time equal to the sum of:
    1. heartbeat timeout (next poll time). This is the time period during which the cluster members have not received any heartbeat from the cluster master. By default this period is 30 seconds.
    2. Time taken by the algorithm to reach consensus.
4. Users can mark a subset of the cluster on which the cluster on which the cluster master can be hoisted. This subset is better suited for participating in consensus due to the presence of redundant network connections and such. But this means that if all the members in the consensus list die, then the cluster will be without a cluster master. It is strongly recommended that the consensus list be of separate machines.

Members of the cluster than can host the cluster master and participate in the consensus algorithm can be marked with a special ConsensusProcessIdentifier in the config.xml. This identifier can be a unique integer value. This can be an attributed on ServerMBean. Customers should just be able to mark the servers that can host the cluster master and the product should be able to generate the identifiers automatically. There can be another attribute on ClusterMBean that specifies the total number of consensus participants. In one embodiment, this attribute is called ConsensusParticipants. It can be the sum total of servers in a cluster that have the ConsensusProcessIdentifier.

Reaching an agreement on who is going to be the cluster leader can be a time consuming process. Once a cluster leader is elected, requests for leases can be arbitrated by the cluster master directly without going through a round of consensus. The cluster leader will update the lease table and replicate the updates to all other members in the consensus list. This can be different from database leasing. In database leasing, all the leases including the lease for the cluster leader can be maintained in the database as peers. In consensus leasing basis, the cluster leader lease can be used to grant other leases quickly.

It can be possible to choose the default leasing basis. Consensus leasing basis can be the default setting. Customers can override the default with the database leasing basis if they want to. A value, such as ClusterMBean.setMigrationBasis( ), can control the default.

The console can allow customers to choose which cluster nodes can host the cluster master and automatically generate the consensus process identifier. It can also set the value ClusterMBean.setConsensusParticipants( ) based on the number of servers chosen in the cluster.

The consensus leasing basis like all other implementations of the LeasingBasis interface can be hidden from subsystems and external users. Subsystems can ask for a singleton service by implementing the weblogic.cluster.singleton.SingletonService interface and then registering with a Singleton.ServiceManager. LockManager can also be implemented on top of leasing.

When a migratable service becomes unavailable for any reason (a bug in the service code, server crashing, network partition) it can be deactivated at its current location and activated on a new server. Should there be a failure while activating on the new server, it can be deactivated on that server and migrated again. By default, we can attempt to start on every candidate server in the cluster until it has either started or failed on every one. If it fails on every single one, it can log an error and leave it deactivated.

A service's liveness can be proven by the maintenance of a lease. The server that the service lives on can be responsible for keeping the lease alive, via a heartbeating mechanism. A server crash can naturally result in the lease timing out. In one embodiment, there is only one lease per Migratable Target. All services on that target can share the lease. In one embodiment, all services on a target can assumed to be somewhat dependent on each other. (Or at least, the user should tolerate one failing service on a target causing the entire target to migrate). In one embodiment, the admin server does not need to be active for automatic migration.

The Migration Master (MM) can keep track of all services it is supposed to keep alive. The information can be available from the configuration. This is useful because if a service is unleased, then it will no longer exist in the table to be monitored. The configuration can be the same across all the services in the cluster.

Servers can be in Manager Service Independence (MSI) mode and still participate in automatic migration. The only restriction is that new services cannot be started. In one embodiment, if they are deployed to a single server, without an admin server to distribute the configuration change, the service will_not_be automatically migrated. When the admin server starts and synchronizes everyone's configuration, migration can be enabled for any newly added services (and can persist even if the admin server is later shut down).

If the leases are lost (for example, network issues may cause the leases to be lost), the server can deactivate its service. The MM can start the service somewhere else. This may result in redundant deactivation calls if the network connection is restored after deactivation but before MM notices the lease timeout, but deactivation is idempotent.

If the service is unhealthy yet not disconnected, it will communicate to the Migratable Target and tell it to relinquish the lease. The MM will notice the lease disappearing/timing out, and will migrate it.

The following method can be added to the Migratable Target:

```
/**
* Called by Migratable classes when they detect a failure
and need to stop and start on a different
server. Should only be used for unrecoverable failures in a
Migratable object. If shutdownServer is true (as it would be for
JTA), then the server will be shutdown and the service deactivated as a
consequence of this. */public void failedService(String serviceName,
boolean shutdownServer)
```

The handling of fencing can be difficult in the case of JTA. Should the deactivation take a long time, there is no way of guaranteeing the service will be deactivated by the time the next server tries to activate it. In this case, if a graceful shutdown takes longer than the lease period, the server can immediately and abruptly exit. Its services can be taken over and recovered by the newly chosen home for the migratable services.

The Migration Master, upon noticing the expired lease, can start a migration. It can set a flag noting that the migration has begun for particular service. This can prevent re-noticing an expired lease and migrating again in the middle of a previous migration. (The same mechanism is used in Server migration.)

The current location of the service (if it is still available) can deactivate itself. Then the new location can call activate on the target. This can be the same code path as in the original migratable services. There can be additional steps introduced, however.

When the target is being activated, its first action can be to claim the lease. This can stop the migration master from constantly checking for its liveness. It can also provide an atomicity lock on the operation, no one else can be activating while this one holds the lease.

Next, the service can check if a named Mode Master (NM) pre-migration script is specified for it. Then it can check for the existence of the node master on the current machine. If it is not there, but there is a script specified, it can stop the migration. If it is there, it can check to see if the node master has performed a specified pre-migration script. If it hasn't run the script already, it can tell the node master to run pre-migration script. Extra flags can be passed to this script, to allow the script to do something different if we're migrating JTA, JMS or something else entirely. Placeholder scripts, can be provided but specific tlog migraton, for example, need not be done.

In one embodiment, activation will not proceed until the node master responds positively that it has run the pre-migration script. We can make repeated attempts to run the pre-migration script. If it cannot for some reason, the migration will stop, and we will let the migration master migrate us to a new server.

At this point, we can call the migratable services' activate( ) methods in order. If they all run without exception, migration is now complete.

If there is an error during activation, we can stop and enter deactivation mode.

Deactivation is essentially the inverse of activation. First, the deactivating server can call deactivate on all the services in the specified order. Exceptions will be logged, but no action can be taken.

Once all the services have had deactivate called, we will perform another node master check. The service will check if a named node master post-migration script is specified for it. Then it can check for the existence of the node master on the current machine. If it is there, check to see if the node master has performed a specified post-migration script. If it hasn't run the script already, tell the node master to run the post-migration script. Extra flags can be passed to this script, to allow the script to do something different if we're migrating JTA. JMS or something else entirely. In one embodiment, we can provide placeholder scripts, but specific tlog migration, for example, cannot be done.

If the post-migration script fails, a kill script will be run, if available. If the kill script fails, activation can continue as normal. In the worst case, we can deactivate everywhere and let the admin reactivate it when the issues have been addressed. Finally, when the script part is complete, the service will give up the lease. Scripts will be run during manual migration, if specified.

In one embodiment, there is no automatic failback mechanism. The service can live in its new location forever, by default. Administration may manually migrate the target to a new (or, in the case of failback, old) server at any time in the same exact manner as they did before.

Should a service be migrated to every server and never come up successfully, it can be left deactivated. Optional settings on the MigratableTargetMBean can control how many attempts to make in terms of the number of complete cluster loops. Note that existing migratable target limitations can still apply; if candidate servers are specified, only servers in the candidate server list will be tried.

The AdditionalMigrationAttempts can default to zero. It can control the number of times we will try to migrate the service across every server in the cluster (or candidate-server list, if specified.) For example, if a cluster has 3 members, and the AdditionalMigrationAttempts is set to 2, we can try to start it on every server in the cluster, then pause, try again, pause, and try one final time. In this example, this means each server can have 3 opportunities to bring up the service successfully.

The pause between migration attempts can be controlled by a value, such as MillisToSleepBetweenAttempts. In one embodiment, this ONLY controls the pause that happens when the service fails to come up on any server, so we start back at the first and try again. While doing normal migrations there need to be no delays.

```
<MigratableTarget
  Cluster="mycluster"
  ConstrainedCandidateServers="server1,server2"
  Name="MIG-TAR-1"
  UserPreferredServer="server1"
  AdditionalMigrationAttempts="2"
  MillisToSleepBetweenAttempts="12000"
  AutoMigratable="true"
/>
```

The following methods can be added to the MigratableTargetMBean:

```
/*
* A migratable service could fail to come up on every possible configured server. This attribute
controls how many further attempts, after the service has failed on every server at least once,
should be tried. Note that each attempt specified here indicates another full circuit of migrations
amongst all the configured servers. So for a 3-server cluster, and a value of 2, a total of 4
additional migrations will be attempted. (the original server is never a valid destination)
*/
get/setAdditionalMigrationAttempts( )
/**
* Controls how long of a pause there should be between the migration attempts described in
getAdditionalMigrationAttempts( ). Note that this delay only happens when the service has failed
to come up on every server. It does not cause any sort of delay between attempts to migrate
otherwise.
*/
get/setMillisToSleepBetweenAttempts( )
```

JMS should be able to restart itself without undergoing an actual migration (for performance purposes, doing a full migration would be a waste of time for the problem in question. For their purposes, a method will be added to MigrationManager that will request a service restart for the named service, or a deactivation and reactivation on the same server, no resources released or acquired. Requests a 'soft migration'. The specified migratable service will be deactivated and then reactivated on the same server. Nodemanager scripts will NOT be invoked. Services that are dependent on this migratable will be restarted as well restartMigratable(Migratable m). Repeated, rapid restart attempts on one server will be interpreted as an error after a certain threshold is met and the target will be migrated. Since this is a method only designed for internal use, external configuration of the threshold need not be provided. Hidden get/set methods on ServerMBean can control how many attempts can be made and how long the period is (For example, it could be set to allow up to 3 restarts within a 12 hour period.) Controls how many times a service may be restarted within the interval specified in getIntervalForRestartAttemptThrottling. get/setAllowedRestartAttempts( )Controls how long the interval is for throttling restart attempts. See getAllowedRestartAttempts. get/setIntervalForRestartAttemptThrottling( ).

The Migration Master can be a service similar to a Cluster Master. It can be a lightweight singleton, stateless and maintained by lease competition, in the same manner as the Cluster Master. Each server can register a permanent interest in obtaining the Migration Master lease. Whatever server currently holds it can perform the starting and stopping of migration tasks. If the current Migration Master crashes or is shutdown, one of the waiting servers will be chosen by the leasing infrastructure to take over the lease, becoming the new Migration Master. The Migration Master does not have to be collocated with the Cluster Master.

The master migration can be the repository of migration information. It can keep records of all the migration it has done (target name, source server, destination server, timestamp). If the admin server is available, it can report migrations to the admin server for console/JMX/WLST display.

Non-debug level logging can be added to provide information to the user when migrations happen. Activation and Deactivation of a target on a server can be logged. The current Migration Master can log the details of the migration: Source, Destination, Target Name, Time. It can also log whether or not each migration passed or failed. A failed migration can be logged as a warning, not an error. If a service cannot be started on any server successfully, we will log an error.

There can be a new interface, SingletonService. MigratableTarget can be modified to extend SingletonService. MigratableTarget can provide additional functionality in the way of pre/post activation scripts required for some of the current services that live on MigratableTargets. Note that the Migratable interface that some may implement is not a SingletonService Migratable merely means a class can be targeted to a MigratableTarget. It is the MigratableTarget itself that is actually operated upon by the code. MigratableTargets can start/stop Migratable classes as appropriate, as they always have.

The Singleton/Service interface may be implemented by customers or internal users looking for a lightweight cluster-wide singleton. It does not have as many features as the MigratableTarget (which will support scripts, candidate machines, etc), but is much easier to configure and create.

A SingletonService can request immediate migration by calling deactivate on itself. The MM will notice the disappeared lease and will migrate the service to a new location. interface SingletonService

```
/*
 * This is called upon server start and during the activation
 * stage of migrating. It should obtain any system resources and
 * start any services required for the SingletonService to begin serving
 * requests.
 */
public void activate( )
/*
 * This is called upon server shutdown and during the deactivation
 * stage of migration. It should release any resources obtained in activate,
 * and stop any services that should only be available
 * from one provider in the cluster.
 */
public void deactivate( )
```

The MigratableTargetMBean can have extra, optional attributes. PreScript, PostScript and AutoMigratable

```
<MigratableTarget
  Cluster="mycluster"
  ConstrainedCandidateServers="server1,server2"
  Name="MIG-TAR-1"
  UserPreferredServer="server1"
  PreScript="../scriptdir/runMeBeforeActivation"
  PostScript="../scriptdir/runMeAfterDeactivation"
  KillScrip="../anotherscriptdir/runMeInCaseOfFailure"
  AutoMigratable="true"
/>
```

The following methods can be added to the MigratableTargetMBean

```
/**
 * Sets the auto migratable value. If a Migratable Target is automatically migratable, it will be
 * migrated automatically upon the shutdown or failure of the server where it currently lives.
 */
get/setAutoMigratable( )
/**
 * Sets the script to run before a Migratable Target is actually activated, Before the target is
 * activated, if there is a script specified and NodeManager available, we will run the script. Setting
 * a script without a NodeManager available will result in an error upon migration. If the script fails
 * or cannot be found, migration will not proceed on the current server, and will be tried on the next
 * suitable server. (The next server in the candidate server list, or the cluster, if there is no candidate
 * list.)
 */
get/setPreScriptFileName( )
/**
 * Sets the script to run after a Migratable Target is fully deactivated. After the target is
 * deactivated, if there is a script specified and NodeManager available, we will run the script.
 * Setting a script without a NodeManager available will result in an error upon migration. If the
 * script fails or cannot be found, migration will still proceed.
 */
get/setPostScriptFileName( )
```

-continued

```
/**
* Sets the script to run in case a Migratable Target's post script fails. Setting a script without a
NodeManager available will result in an error upon migration. If the script fails or cannot be
found, migration will still proceed.
*/
get/setKillScriptFileName( )
```

The console migration target page can require an extra checkbox to allow enabling of automatic migration. PreScript and PostScript are not required, but will be executed if they exist. The console editing page for Migratable Targets can have these options settable there.

Multiple Migratable Services targeted to one Migratable Target can specify the order of their activation, in case there are dependencies. Targets that are auto-migratable need not be ordered with respect to each other. Service order will still be respected whether or not the target is automatically migratable or not.

Ordering need not be exposed to customers. The Migratable Target infrastructure in general is internal only.

Migratable services can be allowed to specify a deployment order in their MBean. The behaviour is modeled on deployment order. There can be a value called 'Order' that accepts integers. (Including negative values.) When a target is asked to activate its component services, it can do so in order of smallest Order to largest Order. If no Order is specified, a default value can be assigned. For consistency, this can be the same default that deployment order uses: 100. If two services have the same Order number, there is no guarantee of their order of activation with regards to each other.

When a target is asked to deactivate its component services, it can do so in order of largest Order to smallest Order. Note that if two services have the same Order number, their deactivation order is not guaranteed be the reverse of their Activation order.

Order can be a dynamic value. The current value of Order is always the one used. This mean that if the Order changes between activation and deactivation, the sequences may not be exact reverse of each other.

The case of a failed activation can follow the same rules as normal activation and deactivation. Deactivation of the successfully activated services can happen in reverse order, unless Order numbers are identical. In that case, the deactivation order may not be a reverse of the activation order.

The weblogic.cluster.migration.Migratable interface can have the following method added:

```
/**
* Returns the order value for this particular migratable object.
This controls in which order this object will be activated and deactivated
with regards to all the other migratable objects deployed
on a migratable target.
*/
public int getOrder( )
```

The implementation and MBeans can be augmented with an additional setOrder method to allow user configuration of this value. This is NOT required, however. It is up to each individual implementation to decide if they want the order configurable.

A default order variable can be provided in the base interface: DEFAULT_ORDER. By default, all current implementating classes will return it from the getOrder( ) call. This can assure that the current behavior will not be changed, until people make a specific effort to change their orderings.

Job Scheduler can make the timers cluster aware and provides the ability to execute them any where in the cluster. Timers are no longer tied to the server that created them.

The purpose of this specification is to:
1. Make timercluster aware: Timers should be able to execute anywhere in the cluster and failover as needed.
2. Provide cron job type of execution within the application server cluster. Users should be able to specify things like "execute this job repeatedly somewhere in the cluster. The job should run if there is at least one running member in the cluster". There is no dependency on the server that actually created the timer. The timer execution is load balanced across the cluster and is able to failover to another running member in case of failures.

There can be two types of timers that can be differentiated based on their lifecycle.

Local Timer
  A local timer can be scheduled within a server JAVE Virtual Machine (JVM) and lives within the same JVM forever. The timer runs as long as the JVM is alive and dies when the JVM exits. The application needs to reschedule the timer on subsequent server startup.

Cluster Wide Timers
  A cluster wide timer can be aware of other server JVM's that form part of the same cluster and is able to load balance and failover. The timers lifecycle is not bound to the server that created it but it is bound to the lifecycle of the cluster. As long as at least one cluster member is alive the timer can be able to execute. Such timers are able to survive a complete cluster restart. Cluster wide timers are created and handled by the Job Scheduler.

Each type can have its own advantages and disadvantages. Local times can handle fine grained periodicity in the order of milliseconds. Job schedulers cannot handle fine grained periodicity with precision as the timers need to be persisted. Cluster wide timers work well with coarse grained intervals in the order of few seconds or more. Job scheduler can be used to schedule jobs like running reports every day or at the end of every week. It cab be important to run the job even if the server that created it is no longer available. Other cluster members can ensure that the job continues to execute.

Job Scheduler can meet the following requirements:
1. Use customer configured database to persist timers and make then available to the entire cluster. Job Scheduler is dependent on a database and cannot function without it. Oracle, DB2, Informix, MySQL, Sybase, MSSQL, are supported.
2. In one embodiment, the Job Scheduler will only work in a cluster.
3. Submitted jobs can run anywhere in the cluster. Two consecutive executions of a job can run on the same server or on different servers. Only one server can execute the job at any given point in time.

4. Job Scheduler is dependent on Leasing. Leasing support is needed to elect the TimerMaster. Each server can also use leasing to claim ownership on the job before executing it.
5. Job Scheduler can use the same leasing basis as Server Migration and Singleton Services.
6. Job Scheduler can be bound into the global JNDI tree of each server using a well defined name. The JNDI name can be "weblogic JobScheduler". Users can cast the looked up object to commonj.timers.TimerManager and use its methods to create jobs.
7. Only Serializable jobs are acceptable by the Job Scheduler. Non-Serializable jobs can be rejected with an IllegalArgumentException.
8. ClusterMBean can expose an attribute called DataSourceForJobScheduler that will be used to access the database. In one embodiment, Job Scheduler functionality is only available with the datasource is configured.
9. In one embodiment, Job Scheduler will only support schedule at fixed delay functionality. Two consecutive job executions are separated by an 'interval' period.
10. In one embodiment, only round-robin load balancing of jobs is supported. Every cluster member will periodically poll the TimerMaster (which is just another cluster member) for ready jobs to execute. The TimerMaster will give a fraction of the total ready jobs to each member for execution.

Job Scheduler can require a database for persisting timers. All databases supported by Server Migration functionality can be supported by Job Scheduler as well. Job Scheduler can access the database using ClusterMBean.getDataSourceForJob.Scheduler( ). In one example for an Oracle database, users can create a table called "weblogic_timers" with the following fields:

| Name | Null? | Type |
|---|---|---|
| TIMER_ID | NOT NULL | VARCHAR2(100) |
| LISTENER | NOT NULL | BLOB |
| START_TIME | NOT NULL | NUMBER |
| INTERVAL | NOT NULL | NUMBER |
| TIMER_MANAGER_NAME | NOT NULL | VARCHAR2(100) |
| DOMAIN_NAME | NOT NULL | VARCHAR2(100) |
| CLUSTER_NAME | NOT NULL | VARCHAR2(100) |
| PRIMARY KEY (TIMER_ID, CLUSTER_NAME, DOMAIN_NAME) | | |

In one embodiment, the Job Scheduler only functions in a cluster. All cluster nodes can participate in executing jobs without discrimination. In one embodiment, Job Scheduler will be turned on only if the DataSourceForJobScheduler ClusterMBean attribute is set to a valid data source in config.xml. Here is an example:

```
<domain>
 ...
 <cluster>
  <name>Cluster-0</name>
  <multicast-address>239.192.0.0</multicast-address>
  <multicast-port>7466</multicast-port>
  <data-source-for-job-scheduler>JDBC Data Source-0</data-source-for-job-scheduler>
 </cluster>
 ...
 <jdbc-system-resource>
  <name>JDBC Data Source-0</name>
  <target>myserver,server-0</target>
```

-continued

```
  <descriptor-file-name>jdbc/JDBC_Data_Source-0-3407-jdbc.xml</descriptor-file-name>
 </jdbc-system-resource>
</domain>
```

Job Scheduler can be looked up using the JNDI name "weblogic.JobScheduler" and cast to commonj.timers.TimerManager. Here is an example:

```
InitialContext ic = new InitialContext( );
commonj.timers.TimerManager jobScheduler =
 (common.timers.TimerManager)
ic.lookup("weblogic.JobScheduler");
commonj.timers.TimerListener timerListener = new
MySerializableTimerListener( );
jobScheduler.schedule(timerListener, 0, 30*1000); // execute this
job every 30 seconds
....
....
private static class MySerializableTimerListener implements
commonj.timers.TimerListener,
java.io.Serializable {
 public void timerExpired(Timer timer) { ... }
}
```

Job scheduler can use leasing functionality to claim ownership of individual timers before execution and to select a Timer Master. The Timer Master can be running on exactly one cluster member and is responsible for allocating timers to individual servers. The leasing basis can be dependent on the ClusterMBean.getLeasingBasis( ) attribute. If the LeasingBasis is set to database then the configuration associated with database leasing can be setup just like in Server Migration. If the LeasingBasis is set to "consensus" then no database support is required for leasing.

Console can provide an option to set ClusterMBean.setDataSourceForJobScheduler( ). The data source can be inherited from server migration or session persistence during shutdown. If customers configure data source for one they should be able to reuse it for Job Scheduler functionality as well.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing descriptions of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A computer implemented system comprising:
   a first application server of a cluster to run a singleton service, the singleton service being such that it only runs on one server of the cluster at a time, the first application server maintaining at lease for the singleton service at a lease table; and
   a migration master to check the lease table and to re-assign the singleton service to a second application server of the cluster if the first application server fails to maintain the lease;
   wherein a cluster leader maintains the lease table in memory at a further application server of the cluster, the cluster leader sending copies of the lease table to other application servers of the cluster; and
   wherein the migration master and cluster leader are on different application servers of the cluster.

2. The computer implemented system of claim 1, wherein the re-assignment of the singleton service is because the first application server crashed.

3. The computer implemented system of claim 1, wherein the re-assignment of the singleton service is because the first application server is partitioned from the lease table.

4. The computer implemented system of claim 1, wherein the first application server heartbeats the lease to maintain control of the singleton service.

5. The computer implemented system of claim 1, wherein the singleton service is a JMS server.

6. The computer implemented system of claim 1, wherein the singleton service is a transaction recovery service.

7. The computer implemented system of claim 1, wherein the singleton service is a timer master.

8. The computer implemented system of claim 1, wherein the second application server runs a predetermined activation script.

9. The computer implemented system of claim 1, wherein the first application server runs a predetermined deactivation script.

10. The computer implemented system of claim 1, wherein the migration master selects the next application server to run the singleton service.

11. The computer implemented system of claim 1, wherein the singleton service is a JMS service and wherein the migration manager attempts a restart on the first application server before any migration.

12. A computer implemented method comprising:
    updating a lease at a lease table for a singleton service at a first application server, the singleton service being such that it only runs on one server of the cluster at a time; and
    checking the lease table with a migration master and reassigning the singleton service to a second application server if the first application server does not maintain the lease;
    wherein a cluster leader maintains the lease table in memory at a further application server of the cluster, the cluster leader sending copies of the lease table to other application servers of the cluster; and
    wherein the migration master and cluster leader are on different application servers of the cluster.

13. The computer implemented method of claim 12, wherein the singleton service is reassigned if the first application server fails to update the lease because of a crash of the first application server.

14. The computer implemented method of claim 12, wherein the singleton service is reassigned if the first application server fails to update the lease because the first application server is partitioned from the lease table.

15. The computer implemented method of claim 12, wherein the first application server heartbeats the lease to maintain control of the singleton service.

16. The computer implemented method of claim 12, wherein the singleton service is a JMS server.

17. The computer implemented method of claim 12, wherein the singleton service is a transaction recovery service.

18. The computer implemented method of claim 12, wherein the singleton service is a timer master.

19. The computer implemented method of claim 12, wherein the second application server runs a predetermined activation script.

20. The computer implemented method of claim 12, wherein the first application server runs a predetermined deactivation script.

21. The computer implemented method of claim 12, wherein the migration master selects the next application server to run the singleton service.

22. The computer implemented method of claim 12, wherein the singleton service is a JMS service and wherein the migration manager attempts a restart on the first application server before any migration.

23. A computer readable medium including code to:
    update a lease at a lease table for a singleton service at a first application server, the singleton service being such that it only runs on one server of the cluster at a time; and
    checking the lease table with a migration master and reassign the singleton service to a second application server if the first application server does not maintain the lease;
    wherein a cluster leader maintains the lease table in memory at a further application server of the cluster, the cluster leader sending copies of the lease table to other application servers of the cluster; and
    wherein the migration master and cluster leader are on different application servers of the cluster.

* * * * *

UNITED STATES PATENT AND TRADEMARK OFFICE
CERTIFICATE OF CORRECTION

PATENT NO. : 7,536,581 B2
APPLICATION NO. : 11/425784
DATED : May 19, 2009
INVENTOR(S) : Fiske It is certified that error appears in the above-identified patent and that said Letters Patent is hereby corrected as shown below:

In column 2, line 26, delete "Alternatively" and insert -- Alternately --, therefor.

In column 2, line 60, delete "least" and insert -- lease --, therefor.

In column 3, line 14, delete "be" and insert -- by --, therefor.

In column 3, line 44, delete "reports. Some" and insert -- reports, such --, therefor.

In column 3, line 51, after "can be" insert -- a --.

In column 3, line 58, after "servers" delete ",".

In column 5, line 3, delete "than" and insert -- that --, therefor.

In column 6, line 13, delete "service." and insert -- services. --, therefor.

In column 6, line 59, delete "Mode" and insert -- Node --, therefor.

In column 7, line 2, delete "migraton" and insert -- migration --, therefor.

In column 7, line 58, delete "Administration" and insert -- Administrator --, therefor.

In column 7, line 66, delete "apply;" and insert -- apply: --, therefor.

In column 9, line 21, delete "migration" and insert -- migrations --, therefor.

In column 9, line 38, after "some" insert -- services --.

In column 9, line 45, delete "Singleton/Service" and insert -- SingletonService --, therefor.

In column 10, line 53, delete "activated," and insert -- activated. --, therefor.

Signed and Sealed this

Eighth Day of June, 2010

David J. Kappos
*Director of the United States Patent and Trademark Office*

In column 11, line 11, delete "migration" and insert -- migratable --, therefor.

In column 11, line 40, delete "mean" and insert -- means --, therefor.

In column 11, line 42, delete "reverse" and insert -- reverses --, therefor.

In column 11, line 63, delete "implementation" and insert -- implementor --, therefor.

In column 11, line 66-67, delete "implementating" and insert -- implementing --, therefor.

In column 12, line 17, delete "timecluster" and insert -- timescluster --, therefor.

In column 12, line 31, delete "JAVE" and insert -- JAVA --, therefor.

In column 12, line 46, delete "times" and insert -- timers --, therefor.

In column 12, line 57, delete "then" and insert -- them --, therefor.

In column 13, line 12, delete "acceptable" and insert -- accepted --, therefor.

In column 13, line 7, delete "descriptions" and insert -- description --, therefor.